(12) United States Patent
Unger et al.

(10) Patent No.: US 9,809,350 B2
(45) Date of Patent: Nov. 7, 2017

(54) CONFIGURABLE SHIPPING CRATE ASSEMBLY

(71) Applicant: THERMO KING CORPORATION, Minneapolis, MN (US)

(72) Inventors: Richard F. Unger, Sauk Centre, MN (US); Robert Michael Lattin, Minneapolis, MN (US); Randy A. Radloff, Lakeville, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 15/191,911

(22) Filed: Jun. 24, 2016

(65) Prior Publication Data

US 2016/0376057 A1    Dec. 29, 2016

Related U.S. Application Data

(60) Provisional application No. 62/186,094, filed on Jun. 29, 2015.

(51) Int. Cl.
| | | |
|---|---|---|
| *B65D 19/12* | (2006.01) | |
| *B65D 8/00* | (2006.01) | |
| *B65D 6/16* | (2006.01) | |
| *B65D 6/26* | (2006.01) | |
| *E04C 3/00* | (2006.01) | |
| *B65D 21/02* | (2006.01) | |
| *F16M 13/02* | (2006.01) | |

(52) U.S. Cl.
CPC ............... *B65D 15/24* (2013.01); *B65D 9/12* (2013.01); *B65D 9/24* (2013.01); *B65D 21/0215* (2013.01); *E04C 3/00* (2013.01); *F16M 13/02* (2013.01)

(58) Field of Classification Search
CPC ... B65D 9/12; B65D 9/24; B65D 7/28; B65D 7/24; B65D 25/24; B65D 19/12; B65D 19/16
USPC .................................. 206/600; 220/1.5, 628
See application file for complete search history.

(56) References Cited

U.S. PATENT DOCUMENTS

| 1,097,502 A | * | 5/1914 | Zwickle | ................... | B65D 9/12 |
| | | | | | 217/43 R |
| 4,885,883 A | | 12/1989 | Wright | | |
| 2005/0163564 A1 | | 7/2005 | Tuell | | |

FOREIGN PATENT DOCUMENTS

| AU | 4567679 | 1/1980 |
|---|---|---|
| AU | 2012258428 | 6/2013 |
| DE | 4027137 | 3/1992 |
| EP | 0228241 | 7/1987 |
| GB | 407961 | 3/1934 |

(Continued)

OTHER PUBLICATIONS

European Search Report issued in corresponding European Application No. 16176983.1 dated Nov. 7, 2016 (9 pages).

*Primary Examiner* — Stephen Castellano
(74) *Attorney, Agent, or Firm* — Hamre, Schumann, Mueller & Larson, P.C.

(57) ABSTRACT

A bracket for securing a plurality of support members for a shipping crate assembly is also disclosed. The bracket forms a corner of the shipping crate assembly. The bracket includes first and second non-identical plates. The first and second non-identical plates are joined along a connection line. The first and second non-identical plates extend perpendicularly from each other. A foot is secured to the first and second non-identical plates, the foot being secured along the connection line.

12 Claims, 12 Drawing Sheets

(56) References Cited

FOREIGN PATENT DOCUMENTS

GB 1476469 6/1977
WO 2007143908 12/2007

* cited by examiner

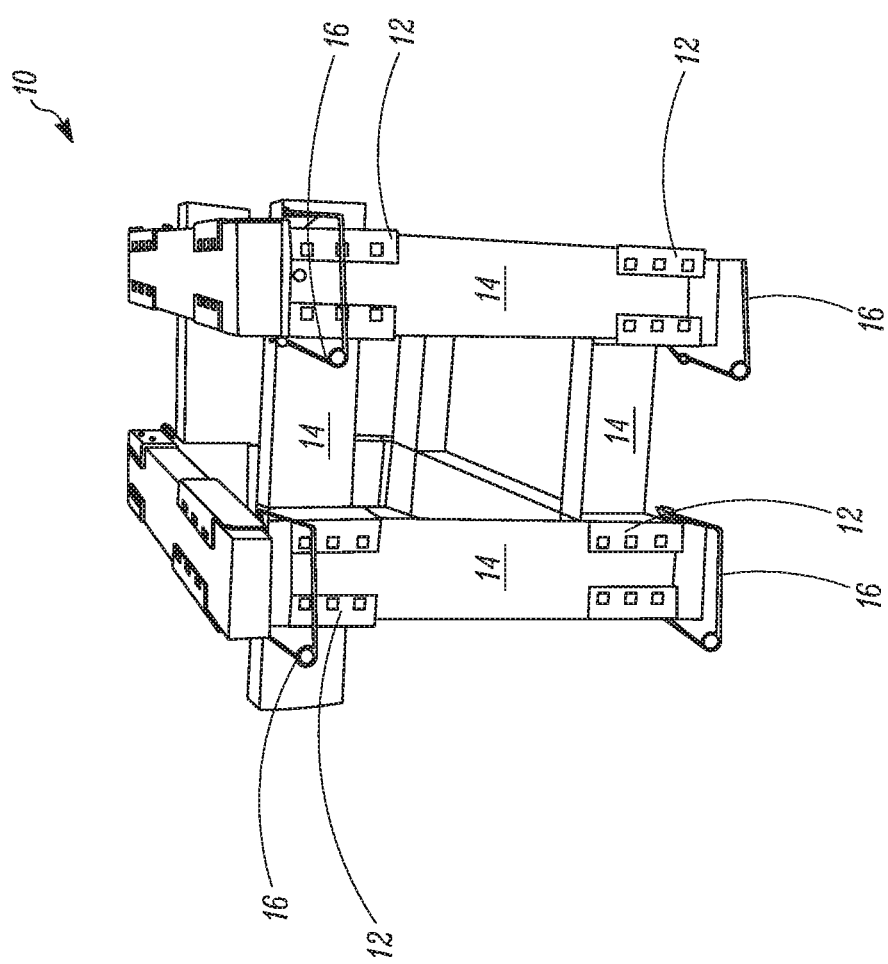

CONFIGURABLE SHIPPING CRATE ASSEMBLY

This application claims benefit of provisional application Ser. No. 62/186,094 filed Jun. 29, 2015.

FIELD

This disclosure relates generally to shipping crates. More specifically, the disclosure relates to a reusable bracket assembly for a configurable shipping crate.

BACKGROUND

Shipping crates (e.g., a pallet, etc.) can generally be used to, for example, support a product during shipment. Shipping crates are generally made of wood, metal, or plastic. Sometimes the shipping crates are made to be returnable so that the shipping crates are returned to a party shipping the product (e.g., a manufacturer or the like) in order to be reused in shipping another product or products. Shipping crates made of wood are often disposable. Shipping crates made of other materials (e.g., metal, plastic, etc.) can be expensive to manufacture, and can be heavy, which can increase a shipping cost due to the increased weight of the product and its shipping container (e.g., shipping crate).

SUMMARY

This disclosure relates generally to shipping crates. More specifically, the disclosure relates to a reusable bracket assembly for a configurable shipping crate.

In some embodiments, a bracket assembly for a configurable shipping crate can include a plurality of bracket assemblies removably fixed to each other. Each of the brackets can include a portion which is configured to receive a support member. The support members and brackets can be assembled to create a shipping crate. In some embodiments, the arrangement of the support members and the bracket assemblies can be selected such that the shipping crate is customized to a particular product or products that the shipping crate will support during, for example, shipment, storage, or the like.

In some embodiments, the bracket assembly can be removably fixed together by, for example, a pin assembly. In some embodiments, the pin assembly can include a combination of a pin and a retainer mechanism.

In some embodiments, the bracket assembly can include a plurality of apertures for fixing the one or more brackets to each other via the pin assembly and/or for receiving a fastener which can retain the support member within a portion of the bracket.

In some embodiments, the support member can be wood. In other embodiments, the support member can be plastic or metal. In some embodiments, the configurable shipping crate can be configured to include support members of varying materials. In such embodiments, the support members can be selectively placed to provide sufficient support for the product or products that will be shipped and/or stored on the configurable shipping crate assembly.

In some embodiments, a strapping material can be added between one or more of the bracket assemblies that is in addition to the support members. In such embodiments, the strapping material can, for example, extend diagonally across the shipping crate assembly. In some embodiments, the material can be non-rigid, such as, for example, rope, chain, or the like.

A bracket assembly is disclosed. The bracket assembly includes a first bracket member, the first bracket member including a first aperture; a second bracket member, the second bracket member including a second aperture; and a pin assembly configured to maintain the first bracket member and the second bracket member in an assembled configuration. The first aperture of the first bracket member and the second aperture of the second bracket member are aligned when the first bracket member and the second bracket member are in the assembled configuration.

A shipping crate assembly is disclosed. The shipping crate assembly includes a plurality of support members; and a plurality of bracket assemblies. Each bracket assembly includes a first bracket member, the first bracket member including a first aperture; a second bracket member, the second bracket member including a second aperture; and a pin assembly configured to maintain the first bracket member and the second bracket member in an assembled configuration. The first aperture of the first bracket member and the second aperture of the second bracket member are aligned when the first bracket member and the second bracket member are in the assembled configuration. The plurality of support members are connected via the plurality of bracket assemblies.

A method for assembling a bracket is disclosed. The method includes aligning a first aperture of a first bracket with a second aperture of a second bracket; inserting a pin assembly having a retainer mechanism into the aligned first and second apertures; and setting the retainer mechanism to a retained configuration such that the first and second brackets are fixed together.

A method for assembling a shipping crate assembly is disclosed. The method includes aligning a first aperture of a first bracket with a second aperture of a second bracket; inserting a pin assembly having a retainer mechanism into the aligned first and second apertures; setting the retainer mechanism to a retained configuration such that the first and second brackets are fixed together; and inserting a support member into one of the first and second brackets.

A bracket for securing a plurality of support members for a shipping crate assembly is also disclosed. The bracket forms a corner of the shipping crate assembly. The bracket includes first and second non-identical plates. The first and second non-identical plates are joined along a connection line. The first and second non-identical plates extend perpendicularly from each other. A foot is secured to the first and second non-identical plates, the foot being secured along the connection line.

A shipping crate assembly is also disclosed. The shipping crate assembly includes a plurality of support members and a plurality of brackets. The plurality of brackets includes first and second non-identical plates. The first and second non-identical plates are joined along a connection line. The first and second non-identical plates extend perpendicularly from each other. A foot is secured to the first and second non-identical plates, the foot being secured along the connection line. Each of the plurality of brackets receives an end of two of the plurality of support members.

A shipping crate assembly kit is also disclosed. The kit includes a plurality of support members, a plurality of brackets, and a plurality of fasteners for securing the plurality of support members to the plurality of brackets. The plurality of brackets includes first and second non-identical plates. The first and second non-identical plates are joined along a connection line. The first and second non-identical plates extend perpendicularly from each other. A foot is secured to the first and second non-identical plates, the foot being secured along the connection line. Each of the plurality of brackets receives an end of two of the plurality of support members.

BRIEF DESCRIPTION OF THE DRAWINGS

References are made to the accompanying drawings that form a part of this disclosure, and which illustrate embodiments in which the systems and methods described in this specification can be practiced.

FIG. 1 illustrates a shipping crate assembly, according to some embodiments.

FIG. 2A illustrates a first side view of the bracket assembly, according to some embodiments. FIG. 2B illustrates a second side view (opposite the first side view) of the bracket assembly, according to some embodiments. FIG. 2C illustrates an exploded view of the bracket in an unassembled configuration, according to some embodiments.

Like reference numbers represent like parts throughout.

DETAILED DESCRIPTION

Figure 2A:
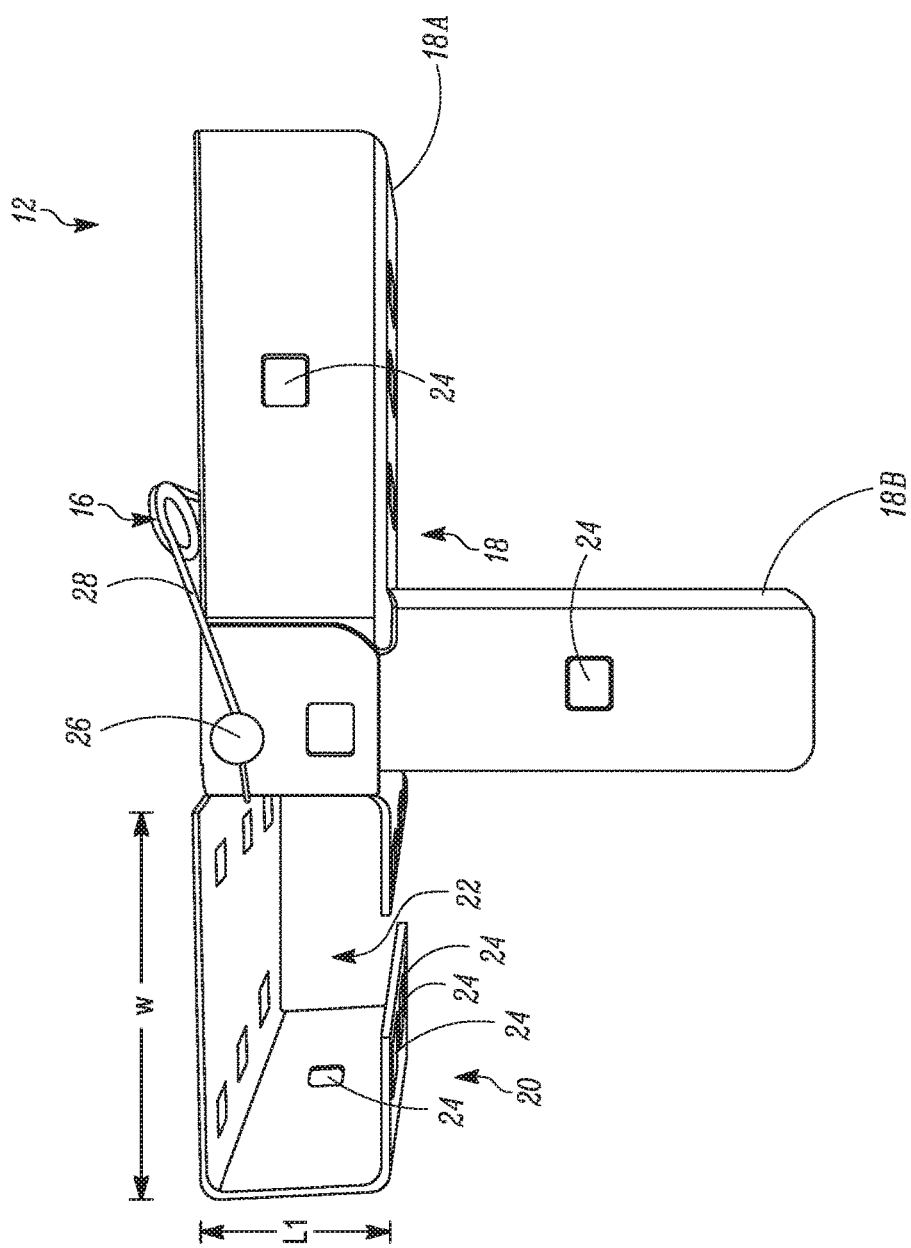
FIGS. 2A-2C illustrate a bracket assembly, according to some embodiments.

This disclosure relates generally to shipping crates. More specifically, the disclosure relates to a reusable bracket assembly for a configurable shipping crate.

Shipping pallets are generally made of wood, metal, and sometimes plastic. The shipping pallets may be reusable. In some instances, the shipping pallets may be used to ship one or more products, and returned after the product has been removed from the shipping pallet. However, the shipping pallet may not always be returned. Wood shipping pallets are generally disposable. However, it may still be relatively expensive to manufacture or purchase the wood shipping pallets. Metal shipping pallets are generally relatively heavy compared to other types of shipping pallets. Though they may last longer and be reusable, the weight can create relatively high costs for shipment of products, particularly since shipment costs are generally correlated with weight of the items being shipped. Plastic shipping pallets may reduce some of the weight, but may still be relatively expensive to manufacture and/or purchase. Metal and plastic shipping pallets also tend to be relatively difficult to modify when a new or different product needs to be shipped.

Embodiments of this disclosure are directed to a configurable shipping crate assembly that is generally made from wood and a plurality of bracket assemblies made of, for example, metal. The use of metal bracket assemblies is generally cheaper and relatively simpler to make than metal and plastic shipping pallets. Further, the configurable shipping crate assembly is generally lighter than a metal shipping pallet, and can be, in some embodiments, lighter than a plastic shipping pallet. The use of bracket assemblies and wood support members in the configurable shipping crate assembly also enables the various bracket assemblies to be assembled in multiple configurations in order to meet the changing shipping needs based on constraints of changing products.

FIG. 1 illustrates a shipping crate assembly 10, according to some embodiments. The shipping crate assembly 10 generally includes a plurality of bracket assemblies 12 and a plurality of support members 14. The shipping crate assembly 10 can generally be configured to support one or more products during, for example, storage, shipment, etc.

The illustrated shipping crate assembly 10 is substantially rectangular cuboidal in geometry. It will be appreciated that the size and shape of the shipping crate assembly 10 can vary according to, for example, an intended use (e.g., product to be shipped, etc.). For example, the shipping crate assembly 10 can be configured to meet size demands of a particular product or products to be stored and/or shipped using the shipping crate assembly 10. The configurability of the shipping crate assembly 10 enables a standard manufacturing process (e.g., manufacturing of a plurality of the bracket assemblies 12) without limiting a size and shape of the shipping crate assembly 10. That is, the shipping crate assembly 10 can be manufactured for usability across product lines, types, etc., without manufacturing distinct shipping crate assemblies. It will be appreciated, however, that the bracket assemblies 12 can be manufactured according to various design considerations such that different configurations of the shipping crate assembly 10 can be created. For example, in the illustrated embodiment, the support members 14 are pieces of 2×4 lumber which is widely available for purchase. The bracket assemblies 12 can be modified such that support members of different shapes and sizes can be used to build the shipping crate assembly 10. For example, in some embodiments, the bracket assemblies 12 could be modified to be used with 2×6 lumber pieces, larger lumber pieces, or materials other than lumber, such as, but not limited to, plastic, metal, or the like. In some embodiments, it may be desirable to use lightweight materials for the support members 14 in order to reduce shipping costs, which are generally calculated based on weight.

The bracket assemblies 12 are generally made of metal, such as, but not limited to, a sheet of metal shaped to fit particular support members 14. In some embodiments, a single bracket assembly 12 is formed of two or more bracket components. The bracket assemblies 12 are generally dimensioned such that when assembled, the interference fit between the bracket assemblies 12 provides a temporary hold that can be more securely fixed using, for example, a pin assembly 16 (e.g., a clevis pin, etc.), a fastener (e.g., nut and bolt), etc. In some embodiments, the bracket assemblies 12 may be designed with different geometries, such that a particular combination of bracket assemblies 12 determines for which corner of the shipping crate assembly 10 the bracket assembly 12 can be used, a number of support members 14 which can be inserted, or the like. For example, a particular configuration for a bracket assembly 12 can be such that a corner can be formed. In another configuration, the bracket assembly 12 can be configured such that it could be used to insert a cross-support member in order to provide additional structural integrity. The bracket assemblies 12 are generally made of metal. However, it will be appreciated that the bracket assemblies 12 can be made of other materials such as, but not limited to, plastic or the like.

In addition to being configurable, the shipping crate assembly 10 is capable of being assembled, disassembled, and reassembled in a plurality of configurations and many different times. As a result, in some embodiments, a shipping crate assembly 10 can be assembled to support a particular product during shipment. After shipment, the shipping crate assembly 10 can be disassembled, and the bracket assemblies 12 can be reused in a different configuration. Accordingly, the bracket assemblies 12 can be reusable for multiple products, multiple parties, or the like.

Figure 2B:
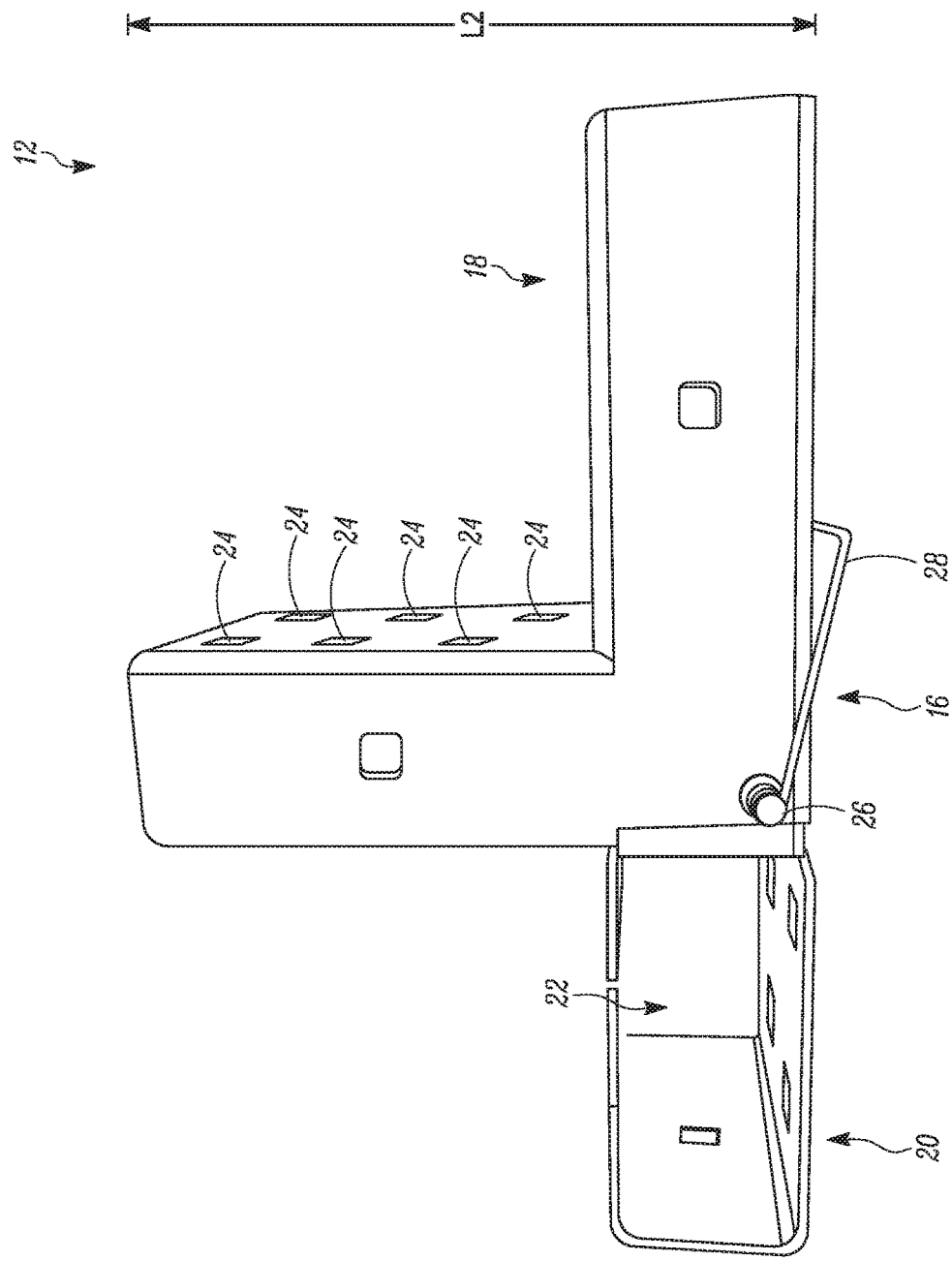
Figure 2C:
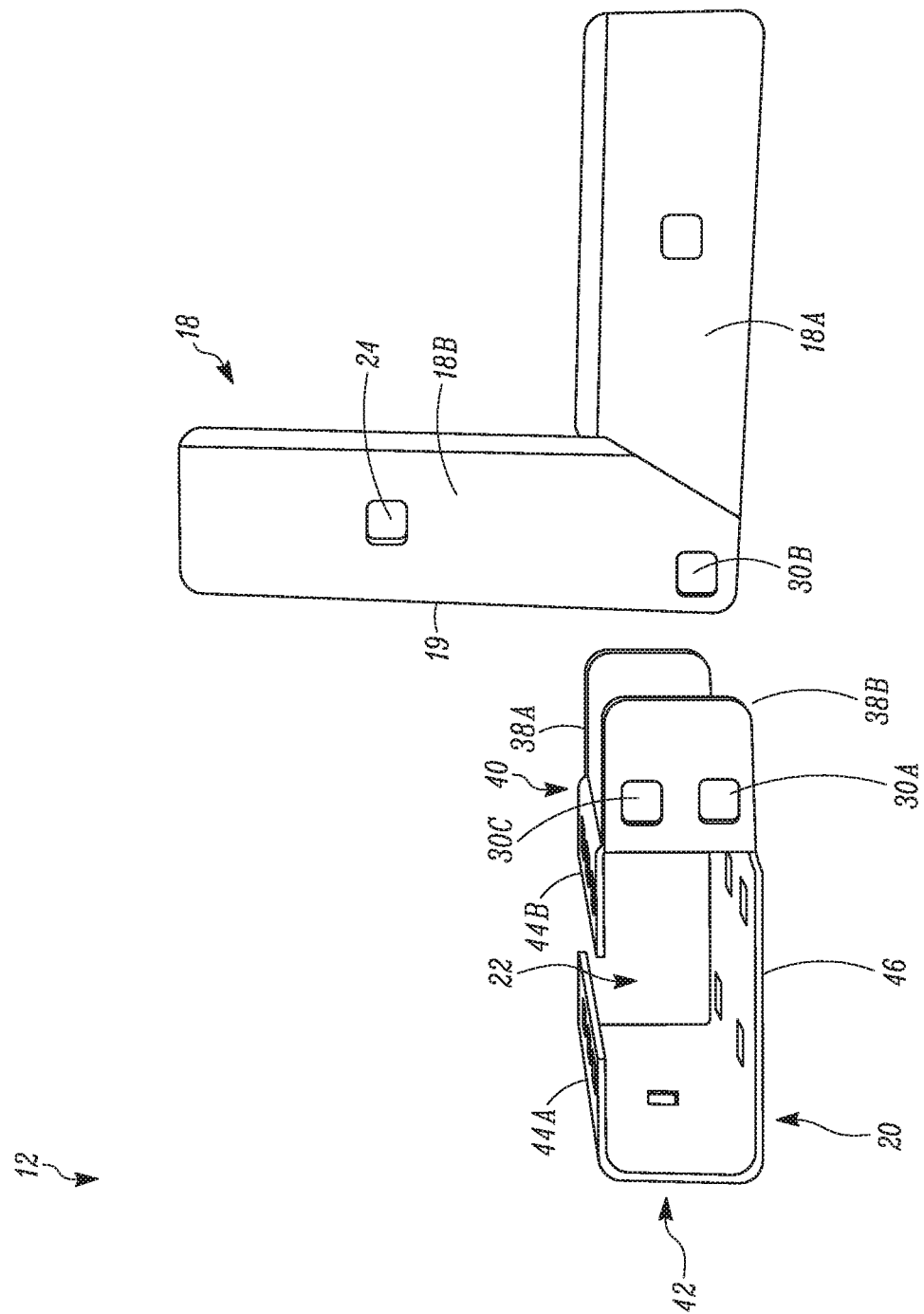

FIGS. 2A-2C illustrate a bracket assembly 12, according to some embodiments. FIG. 2A illustrates a first side view of the bracket assembly 12. FIG. 2B illustrates a second side view (opposite the first side view) of the bracket assembly 12. FIG. 2C illustrates an exploded view of the bracket assembly 12 prior to being assembled. Unless specifically indicated otherwise, reference will be generally made to the aspects of FIGS. 2A-2C, without specific reference to a particular one of the FIGS. 2A-2C.

The bracket assembly 12 is an assembly that includes a plurality of brackets including a first bracket 18 and a second bracket 20.

As illustrated, the first bracket 18 is configured to receive a plurality of support members 14 (FIG. 1). That is, the first bracket 18 includes a first support-receiving section 18A and a second support-receiving section 18B. In some embodiments, the first and second support-receiving sections 18A, 18B can be configured to be disposed at or about an angle of 90° relative to each other. In some embodiments, the first and second support-receiving sections 18A, 18B can be configured to be disposed at or about an angle of greater than 90° relative to each other. In some embodiments, the first and second support-receiving sections 18A, 18B can be configured to be disposed at or about an angle of less than 90° relative to each other. The various angles can be selected to provide a desired configuration for the shipping crate assembly 10 (FIG. 1). The various angles at which the first and second support-receiving sections 18A, 18B can be disposed relative to each other may be selected, for example, based on a particular product or products for which the assembled shipping crate assembly 10 will be used.

As illustrated, the second bracket 20 is configured to receive a single support member 14 (FIG. 1). The support member 14 would be received in an open area 22. As can be seen in FIG. 2, the second bracket 20 has a generally C-shaped cross-section, with the open area being disposed inside the C-shape. The bracket 20 includes a length L1 and a width W. These dimensions will vary depending upon what type of support member 14 is intended to be used with the bracket 18. For example, bracket 18 is generally configured to receive a 2×4 lumber piece (such as in FIG. 1). Accordingly, the dimensions L1 and W are selected such that the open area 22 is large enough to accommodate the 2×4 lumber piece, but small enough such that the 2×4 lumber piece has a relatively snug fit.

The first and second brackets 18, 20 include a plurality of apertures 24. The plurality of apertures 24 is disposed in a variety of locations on the first and second brackets 18, 20. At least one of the plurality of apertures 24 on each of the first and second brackets 18, 20 is disposed in an area in which the first bracket 18 overlaps with the second bracket 20 when the first and second brackets 18, 20 are in an assembled configuration. As a result, the at least one of the apertures 24 disposed on the first bracket 18 is aligned with the at least one of the apertures 24 on the second bracket 20, thereby enabling the pin assembly 16 to be inserted into and through the apertures 24 of the first and second brackets 18, 20 that are in alignment so that the brackets 18, 20 can be held together. Others of the plurality of apertures 24 are disposed on the various surfaces of the first and second brackets 18, 20 such that a fastener (e.g., bolt, screw, etc.) can be inserted in order to hold the one or more support members 14 in place. In some embodiments, additional strapping, such as, but not limited to, chain, rope, etc., can be connected diagonally between two different corners of the shipping crate assembly 10. In such embodiments, the apertures 24 may serve as connection points for the strapping.

The pin assembly 16 which maintains the first and second brackets 18, 20 in the assembled configuration generally includes a pin 26 (e.g., a clevis pin, etc.) and a securing member 28. The configuration of the pin assembly 16 will be described in additional detail in accordance with FIG. 6 below.

With reference specifically to FIG. 2C, an exploded view of the bracket assembly 12 is shown. The bracket assembly 12 is the same bracket assembly 12 as that depicted in FIGS. 2A-2B. For simplicity of the figure, the pin assembly 16 is not illustrated. It will be appreciated that in order to complete the assembly of the bracket assembly 12, the pin assembly 16 would be inserted into the aligned apertures 24 of the first and second brackets 18, 20. More specifically, the aperture 30A and the aperture 30B will be aligned when the first and second brackets 18, 20 are in an assembled configuration.

To assemble the bracket assembly 12, the first bracket 18 and the second bracket 20 are aligned such that flanges 38A and 38B, which extend from a face 40 of the second bracket 20, overlap with a portion of the first bracket 18. In the illustrated embodiment, the first and second brackets 18, 20 would be moved horizontally (e.g., in a left-right direction) towards each other. In some embodiments, the face 40 of the second bracket 20 from which the flanges 38A, 38B extend may contact a face 19 of the first bracket 18 which is directly opposite the face 40 of the second bracket 20. In some embodiments, these faces 19, 40 of the first and second brackets 18, 20 may not contact each other. In some embodiments, the contact may be one manner in which the assembler can identify that the first and second brackets 18, 20 are properly aligned. Once the first and second brackets 18, 20 are in an assembled configuration, the apertures 30A and 30B will be aligned, such that pin assembly 16 can be inserted through flange 38B, through the first bracket 20, and out through the flange 38A. It will be appreciated that the brackets 18, 20 can be fixed together by a fastener other than the pin assembly 16, such as, but not limited to, a bolt and nut, or the like.

Alternatively, the second bracket 20 can be rotated by about 90° in a counterclockwise direction in order to assemble the first and second brackets 18, 20 together in a different configuration. It will be appreciated that as an alternative to the second bracket 20 being rotated by about 90° in the counterclockwise direction, the first bracket 18 could be rotated by about 90° in a clockwise direction. If the first and second brackets 18, 20 were then assembled together, the aperture 30C of the second bracket 20 would be aligned with the aperture 30B of the first bracket 18 when the first and second brackets 18, 20 are properly aligned to be in the assembled configuration, at which point the pin assembly 16 could be inserted through the first and second brackets 18, 20.

Figure 3:
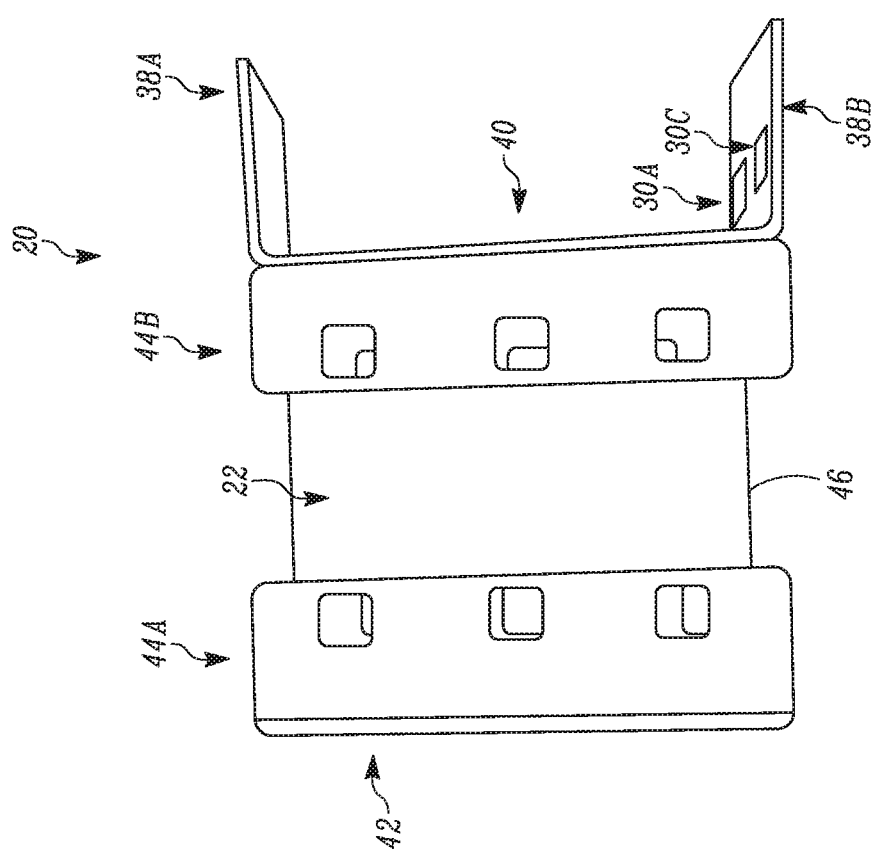
FIG. 3 illustrates a view of a second bracket, according to some embodiments.

FIG. 3 illustrates a view of the second bracket 20, according to some embodiments. The second bracket 20 generally includes the face 40, from which the flanges 38A, 38B extend. The apertures 30A and 30C are disposed on the flange 38B. It is to be appreciated that the flange 38A also includes apertures (not shown in FIG. 3). The second bracket 20 includes the face 40, a face 46, a face 42, and faces 44A, 44B. The second bracket 20 is generally rectangular box-shaped in geometry. The faces 44A, 44B are not connected to each other, such that a portion of the rectangular box-shape is open.

Figure 4:
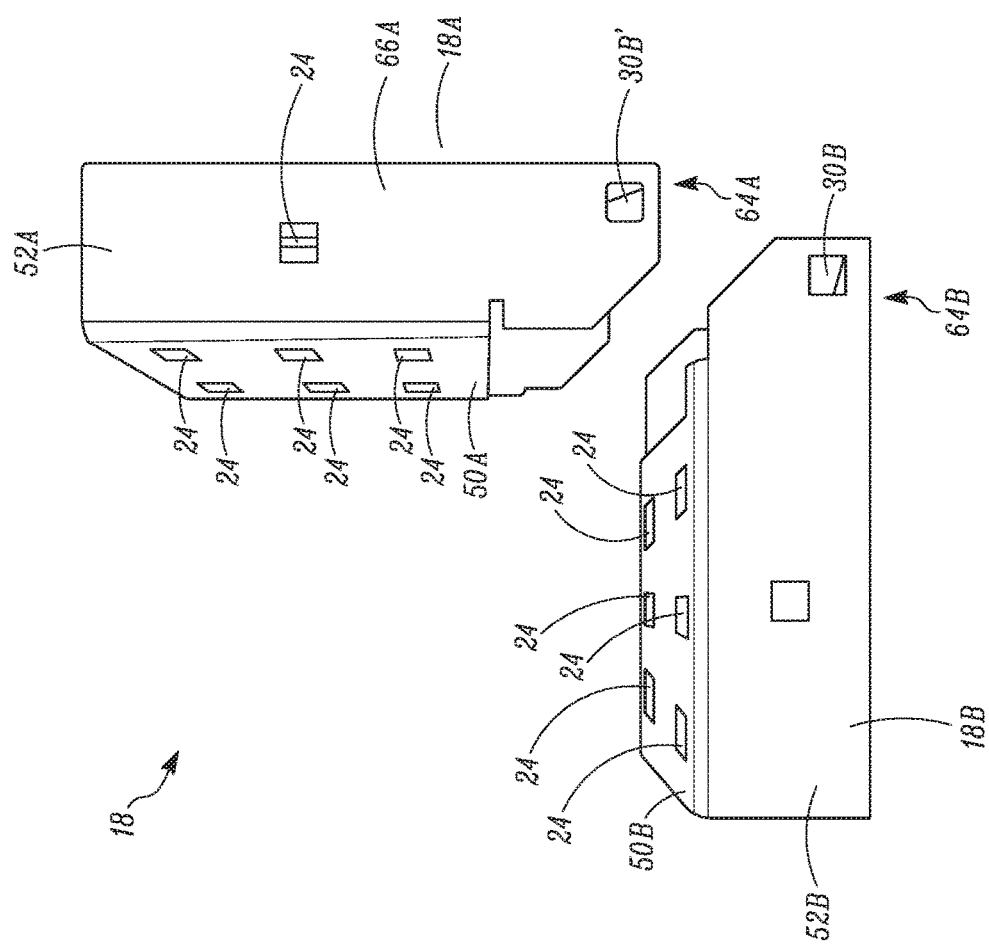
FIG. 4 illustrates a view of a first bracket, according to some embodiments.

FIG. 4 illustrates a view of the first bracket 18, according to some embodiments. In the illustrated embodiment, the first bracket 18 includes the first and second support-receiving sections 18A, 18B. The first and second support-receiving sections 18A, 18B are illustrated as being separate members. It is to be appreciated that the first and second support-receiving sections 18A, 18B can alternatively be separate members that are fixed together. For example, in some embodiments, the first and second support-receiving sections 18A, 18B could be fixed together by welding, adhesives, fasteners (e.g., nuts and bolts), etc. As illustrated, the first and second support-receiving sections 18A, 18B are generally substantially similar. When assembling the first and second-support receiving sections 18A, 18B, the aperture 30B of the second-support receiving sections 18B and an aperture 30B' of the first-support receiving section 18A are aligned. Once aligned, a pin assembly 16 (FIG. 6) can be inserted through the apertures 309, 30B' to hold the first and second-support receiving sections 18A, 18B together.

Figure 5:
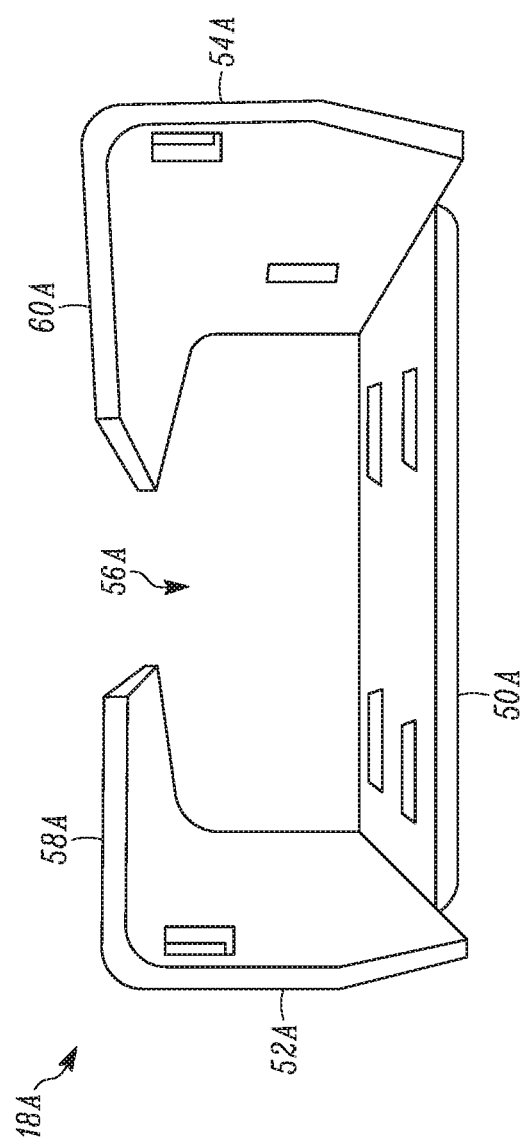
FIG. 5 illustrates a view of a first-support receiving section, according to some embodiments.

FIG. 5 illustrates a view of the first-support receiving section 18A, according to some embodiments. It is to be appreciated that the second-support receiving section 18B can include similar features as the first-support receiving section 18A. For simplicity of this specification, the first-support receiving section 18A will be described. With reference to FIGS. 4 and 5, the first-support receiving section 18A includes a face 52A, a face 50A, a face 54A, and faces 58A, 60A. Similar to the second bracket 20, the first-support receiving section 18A is generally rectangular-box shaped in geometry. The faces 58A, 60A are not connected to each other, such that a portion of the rectangular box-shape is open. The first-support receiving section 18A includes an open space 56A. The open space 56A receives a support member (e.g., support member 14 of FIG. 1). As illustrated in FIG. 4, the first-support receiving section 18A can include an end 64A including a flange 66A that mates with an end 64B of the second-support receiving section 18B.

Figure 6:
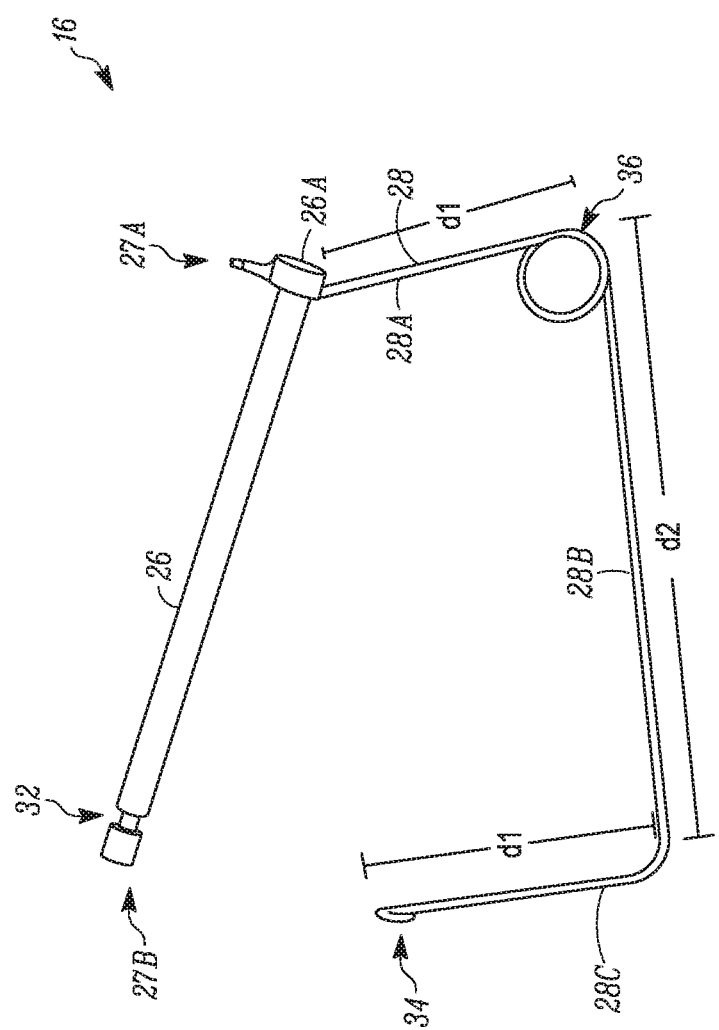
FIG. 6 illustrates a pin assembly, according to some embodiments.

FIG. 6 illustrates a pin assembly 16, according to some embodiments. The pin assembly 16 is generally representative of the pin assembly 16 as identified hereinabove. The pin assembly 16 is insertable into one of the plurality of apertures 24 of the first and second brackets 18, 20 of the bracket assemblies 12 in order to maintain the first and second brackets 18, 20 in an assembled configuration.

The pin assembly 16 generally includes a pin 26 and a retainer mechanism 28. The pin 26 can be, for example, a clevis pin or the like. It will be appreciated that other types of quick-release type pins may be suitable for the pin assembly 16. For example, the pin 26 could use a cotter pin to maintain the pin 26 in the apertures 24 of the first and second brackets 18, 20 (FIGS. 1-2). In some embodiments, the pin assembly 16 can alternatively be a stud with a nut, a bolt with a nut, sheet metal with a locking tab member, or the like. The pin 26 includes a head 26A at a first end 27A of the pin 26. The head 26A is generally larger than a size of the apertures 24. At a second end 27B of the pin 26 is a recess 32. The recess 32 is configured to receive an end of the retainer mechanism 28 in order to retain the pin 26 in the apertures 24 and maintain the assembled configuration of the bracket assembly 12 (FIGS. 1-2).

The retainer mechanism 28 can be fixed to the head 26A of the pin 26. In the illustrated embodiment, the retainer mechanism 28 includes a torsional spring 36 and a hook 34. A first section 28A of the retainer mechanism 28 extends from the head 26A for a first distance d1. The torsional spring 36 is disposed at or about the first distance d1. A second section 28B of the retainer mechanism 28 extends a second distance d2 at about a 90° angle with respect to the first section 28A. The second distance d2 is about the same as a distance between the head 26A and the recess 32. A third section 28C extends at about a 90° angle with respect to the second section 28B for the distance d1. At an open end of the third section 28C is the hook 34, which is configured to be placed in the recess 32 in order to maintain the pin assembly 16 in an assembled state of the bracket. The torsional spring 36 is configured to provide a force such that the retainer mechanism 28 is maintained in an assembled configuration when the hook 34 is inserted around the pin 26 and into the recess 32.

Figure 7:
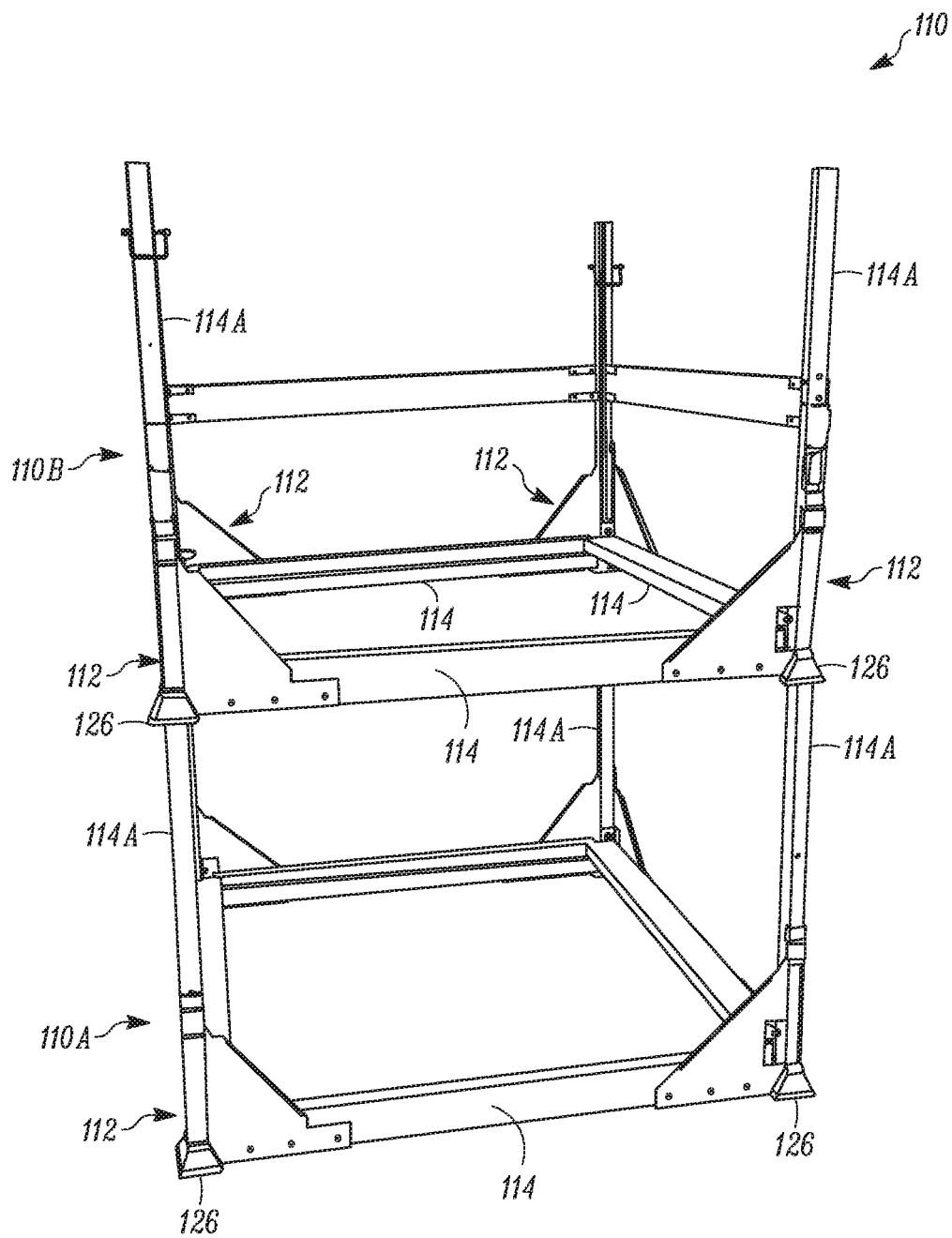
FIG. 7 illustrates a shipping crate assembly, according to other embodiments.

FIG. 7 illustrates a shipping crate assembly 110, according to other embodiments. It will be appreciated that the shipping crate assembly 110 can have aspects which are the same as or similar to aspects of the shipping crate 10 described above with respect to FIG. 1.

The shipping crate assembly 110 generally includes a plurality of brackets 112 and a plurality of support members 114. The shipping crate assembly 110 can generally be configured to support one or more products during, for example, storage, shipment, etc. FIG. 7 includes a plurality of shipping crate assemblies 110A, 110B in a stacked manner to form the shipping crate assembly 110.

The illustrated shipping crate assembly 110 is substantially rectangular cuboidal or cuboidal in geometry. It will be appreciated that the size and shape of the shipping crate assembly 110 can vary according to, for example, an intended use (e.g., product to be shipped, etc.). For example, the shipping crate assembly 110 can be configured to meet size demands of a particular product or products to be stored and/or shipped using the shipping crate assembly 110.

The configurability of the shipping crate assembly 110 can enable a standard manufacturing process (e.g., a manufacturing process for the plurality of brackets 112) without limiting a size and shape of the shipping crate assembly 110. That is, the shipping crate assembly 110 can be manufactured for usability across one or more product lines, product types, etc., without manufacturing distinct shipping crate assemblies for each product line, product type, etc. It will be appreciated, however, that the brackets 112 can be manufactured according to various design considerations such that different configurations of the shipping crate assembly 110 can be created.

For example, in the illustrated embodiment, the support members 114 are pieces of 2×4 lumber which is widely available for purchase. The brackets 112 can be modified such that support members of different shapes and sizes can be used to build the shipping crate assembly 110. In some embodiments, the brackets 112 may not require modification in order to, for example, support alternative materials. For example, in some embodiments, the brackets 112 can be used with 2×6 lumber pieces, larger lumber pieces, or materials other than lumber such as, but not limited to, plastic, metal, or the like. In some embodiments, it may be desirable to use lightweight materials for the support members 114 to reduce shipping costs, which are generally calculated based on weight.

The brackets 112 are generally made of metal such as, but not limited to, a sheet of metal. In some embodiments, the bracket can be formed of a single piece of material that is bent along a bend line. In some embodiments, the bracket 112 can be formed of two or more bracket components. The brackets 112 can serve as the corners of the shipping crate assembly 110. In some embodiments, the brackets can be made of materials other than metal, such as, but not limited to, plastic or the like.

In addition to being configurable, the shipping crate assembly 110 is capable of being assembled, disassembled, and reassembled in a plurality of configurations and many different times. As a result, in some embodiments, the shipping crate assembly 110 can be assembled to support a particular product during shipment. After shipment, the shipping crate assembly 110 can be disassembled, and the brackets 112 can be reused in a same of in a different configuration. Accordingly, the brackets 112 can be reusable for multiple products, multiple parties, or the like. Further, the support members 114 can be reused in a same or a different configuration, for a different purpose, etc.

The brackets 112 include a support member 114A which can be used to provide additional structural rigidity. In this manner, the support member 114A can be made of, for example, metal. In some embodiments, the metal of the support member 114A can be the same as or similar to a metal for the bracket 112. The brackets 112 include a foot 126. The foot 126 can include an aperture into which an end of the support member 114A can be inserted. In this manner, a plurality of shipping crate assemblies 110A, 110B can be stacked to form the shipping crate assembly 110.

In some embodiments, the shipping crate assembly 110 as shown and described in accordance with FIGS. 7-10 can provide a configurable shipping crate assembly. The brackets 112 can provide a sturdy, easy to assemble shipping crate assembly. In some embodiments, the shipping crate assembly 110 can reduce an amount of wood which is required to build the shipping crate assembly. In some embodiments, the shipping crate assembly 110 is reusable. Accordingly, an amount of wood which may otherwise be disposed can be reused to ship and/or store a same or a different product. In some embodiments, the shipping crate assemblies 110A, 110B are stackable. Because the foot 126 of the shipping crate assembly 110B can interlock with a part of the support member 114A of the shipping crate assembly 110A, the stacked shipping crate assemblies 110A, 110B can provide an interlocked arrangement which can, in some embodiments, reduce a likelihood of shifting during shipment.

Figure 8:
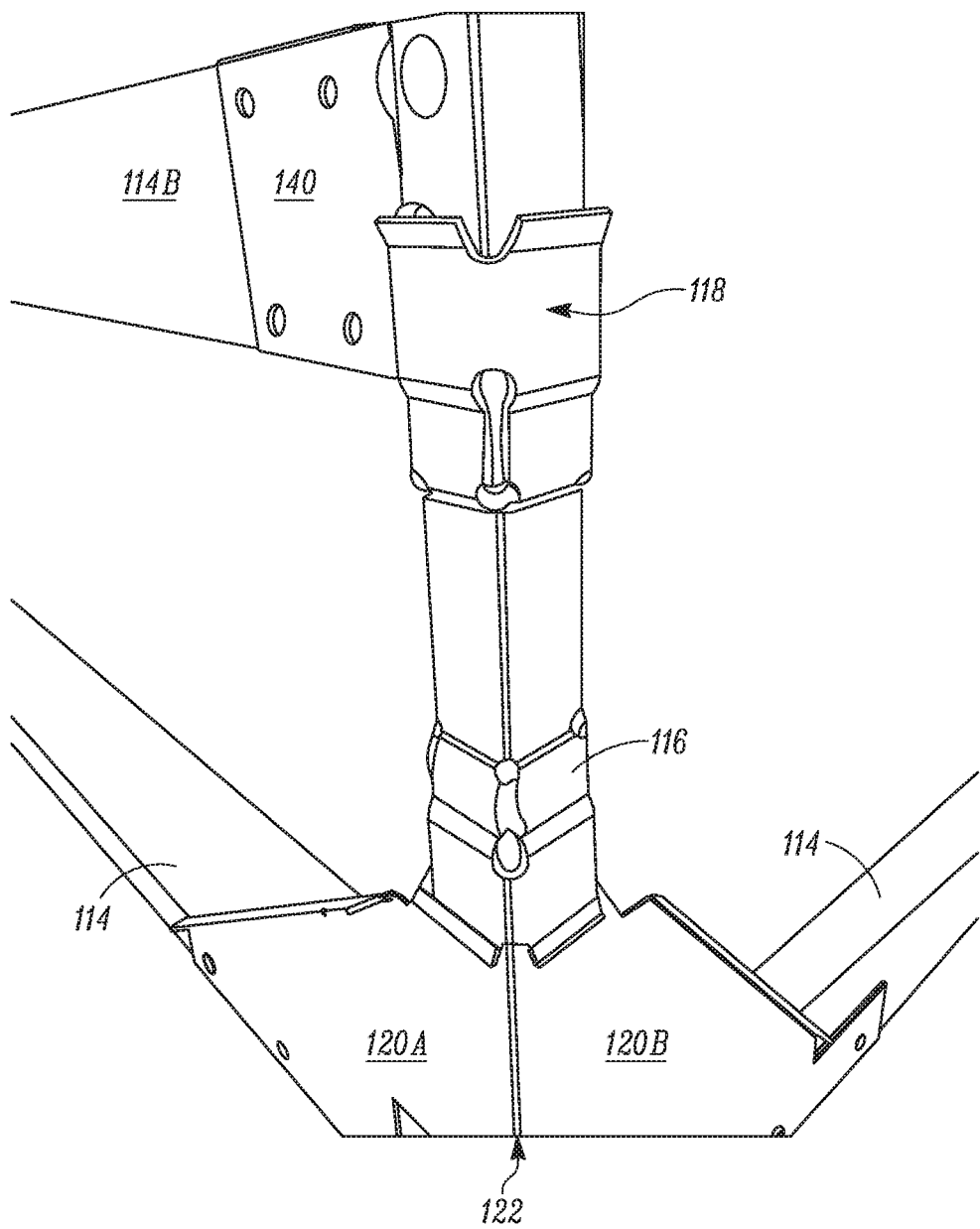
FIG. 8 illustrates a bracket for the shipping crate assembly of FIG. 7, according to some embodiments.

FIG. 8 illustrates a portion of the bracket 112 for the shipping crate assembly 110 of FIG. 7, according to some embodiments. The support member 114A includes a fixture 116 and a fixture 118. The fixtures 116, 118 generally can be used to secure a portion of the shipping crate assembly 110 in place.

The fixture 116 can secure the support member 114A in a configuration in which the support member 114A is maintained in an assembled configuration. The fixture 116 can provide a space between the support member 114A and the fixture 116 such that a portion of the bracket 112 can be inserted into the space of the fixture 116, thereby holding the support member 114A in the assembled configuration. The fixture 116 can provide, for example, an interference fit between the fixture 116 and the bracket 112.

The fixture 118, which may be the same as or similar to the fixture 116, can provide a location at which support members 114 can be secured. For example, the support member 114B can be a cross-support of the shipping crate assembly 110. The cross-support can, for example, provide additional rigidity to the shipping crate assembly 110. In some embodiments, the cross-support can provide protection for the product being stored or shipped in the shipping crate assembly 110. A bracket 140 may be insertable into the space between the support member 114A and the fixture 118 to maintain the support member 114B in an assembled configuration. The bracket 140 may be installed on an end of the support member 114B. In some embodiments, the bracket 140 can include one or more apertures such that a pin, bolt, or other fastener can be used to maintain the support member 114E in the assembled configuration. The fixture 118 can provide, for example, an interference fit between the fixture 118 and the bracket 140, according to some embodiments.

Figure 9:
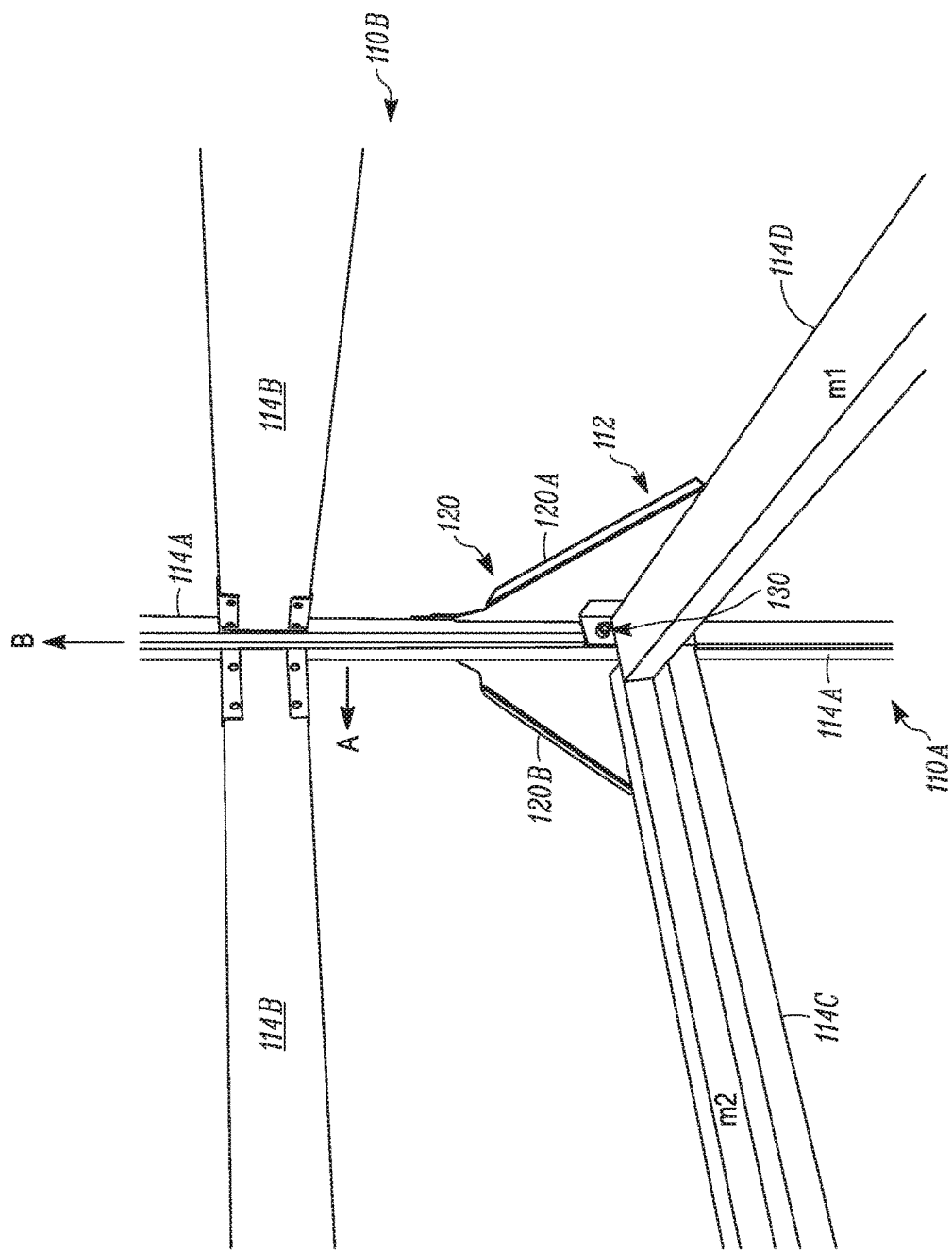
FIG. 9 illustrates a bracket for the shipping crate assembly of FIG. 7, according to some embodiments.

FIG. 9 illustrates the bracket 112 for the shipping crate assembly 110 of FIG. 7, according to some embodiments. In the illustrated figure, the bracket 112 is in the assembled configuration. As shown in the figure, the support member 114A includes a pin 130. The pin 130 can be, for example, a bolt, or the like. The pin 130 provides a rotational axis via which the support member 114A can rotate in a direction A between the assembled configuration and an unassembled configuration. In use, the support member 114A can be moved in a direction B of a longitudinal axis of the support member 114A, thereby disengaging the fixture 116 to unsecure the support member 114A from the bracket 112. Once unsecured, the support member 114A can be rotated in the direction A toward the support member 114C. It will be appreciated that the pin 130 can be rotated by 90° such that the rotation direction A would enable the support member 114A to rotate toward the support member 114D.

Because the support member 114A is rotatable, the support member 114A can be rotated into the unassembled configuration in which the support member 114A generally lies against the support member 114C. Accordingly, in an unassembled configuration the support member 114A may take up less space (in a vertical direction) than in the assembled configuration. This can, in some embodiments, reduce a size of the shipping crate assembly 110 for ease of storage or for ease of returning the shipping crate assembly 110 to, for example, a manufacturer or distributor of the product having been shipped in the shipping crate assembly 110. In some embodiments, the shipping crate assemblies 110A, 110B are stackable even in the unassembled configuration, with the foot 126 stacking on the bracket 112 instead of the support member 114A.

As illustrated, the support members 114C and 114D are oriented differently with respect to the bracket 112. That is, a major surface M1 of the support member 114D is substantially perpendicular to a major surface M2 of the support member 114C. Further, the support member 114C is disposed vertically lower (with respect to the page) than the support member 114D. This configuration can enable a moving device (e.g., a forklift, pallet jack, etc.) to be inserted under the support member 114D (but not under the support member 114C).

Figure 10:
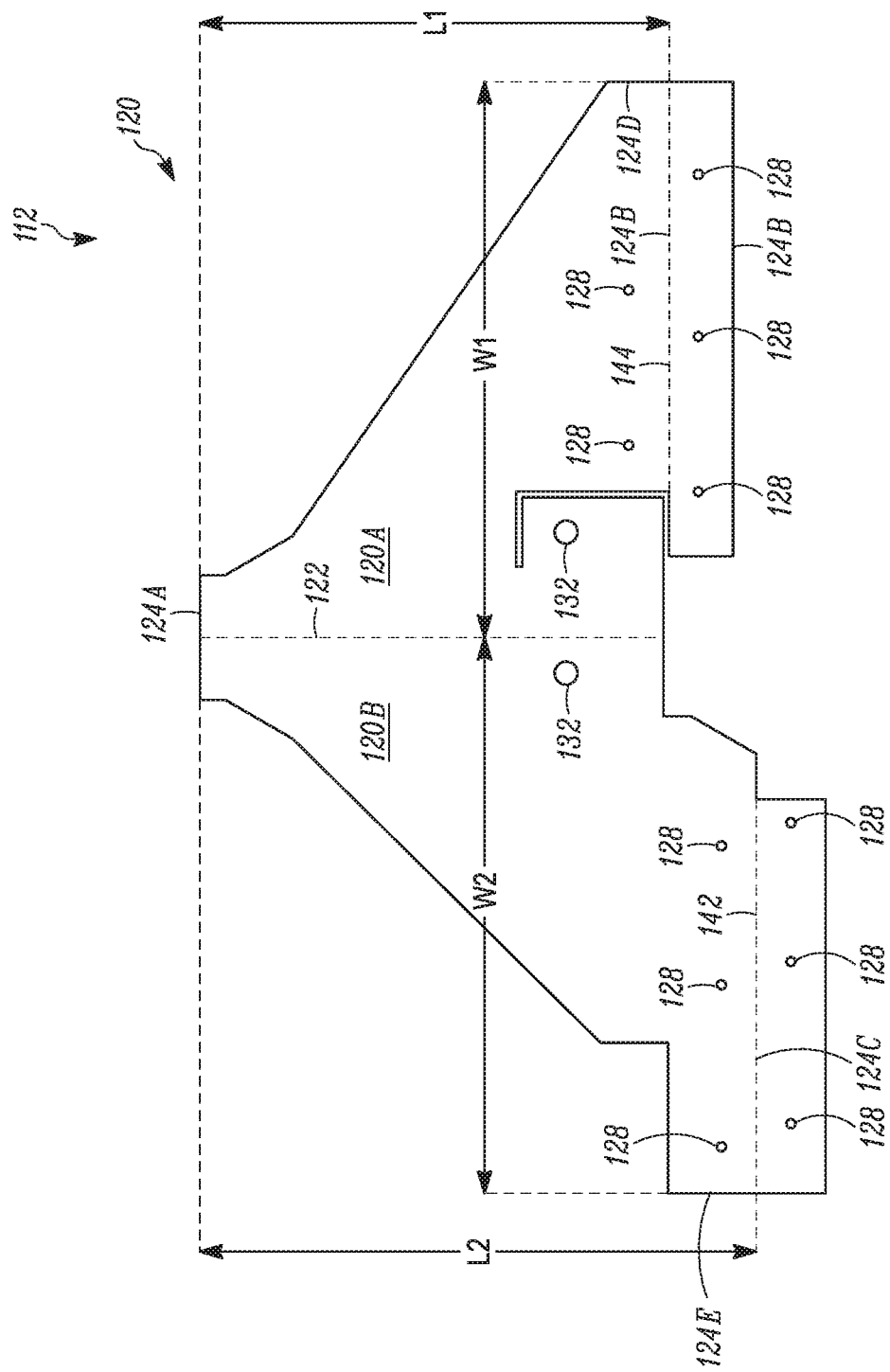
FIG. 10 illustrates a top view of a bracket for the shipping crate assembly of FIG. 7, according to some embodiments.

FIG. 10 illustrates a top view of the bracket 112, according to some embodiments. In the illustrated view, the bracket 112 is illustrated in a configuration in which the bracket 112 may be in process of manufacturing.

The bracket 112 includes a bracket member 120 having first and second parts 120A, 120B. The first and second bracket parts 120A, 120B are non-identical. In some embodiments, the first and second bracket parts 120A, 120B can be identical. The first and second bracket parts 120A, 120B are separated by a connection line 122. In some embodiments, the connection line 122 can be referred to as the bend line 122. The connection line 122, in some embodiments, represents a line along which the bracket member 120 can be bent such that the first and second bracket parts 120A, 120B are disposed perpendicular to each other. In some embodiments, the first and second bracket parts 120A, 120B can be a single piece of material (e.g., a single piece of metal) that is bent along the connection line 122. In some embodiments, the first and second bracket parts 120A, 120B can be separate pieces of material that are fixed (e.g., welded, glued, etc.) together at the connection line 122. In some embodiments, the first and second bracket parts 120A, 120B can be a single piece of material formed by, for example, 3D printing, or the like.

The bracket member 120 also includes bend lines 142 and 144. The bend line 142 is disposed on the second bracket part 120B. The bend line 144 is disposed on the first bracket part 120A. The bend lines 142, 144 represent locations at which the bracket member 120 may be bent in a direction that is perpendicular to a surface of the bracket member 120. The bend lines 142, 144 may result in a lip upon which the support members 114 (FIGS. 7-9) can be supported and subsequently secured.

The bracket member 120 includes a plurality of apertures 128 which can serve as a location at which one or more fasteners (e.g., screws, bolts, etc.) can be used to removably secure the support members 114 to the bracket 112.

The bracket member 120 includes lengthwise extents 124A, 124B, and 124C. The lengthwise extent 124B is an extent of the first bracket part 120A. The lengthwise extent 124C is an extent of the second bracket part 120B. A distance L1 between the lengthwise extent 124A and 124B represents a length of the first bracket part 120A. A distance L2 between the lengthwise extent 124A and 124C represents a length of the second bracket part 120B. The distances L1 and L2 can be different. In some embodiments, the distance L1 can be less than the distance L2.

A distance from the connection line 122 to a widthwise extent 124D of the first bracket part 120A is represented as W1. A distance from the connection line 122 to a widthwise extent 124E of the second bracket part is represented as W2. In some embodiments, the distance W1 and the distance W2 can be at or about the same. In some embodiments, the distance W1 and the distance W2 can be different.

The bracket 112 also includes a plurality of apertures 132. The apertures 132 are configured to receive the pin 130. Accordingly, the apertures 132 provide a location about which the support member 114A can be rotated. In some embodiments, the first bracket part 120A and the second bracket part 120B can each include one of the plurality of apertures 132 such that the pin 130 can be secured to either the first bracket part 120A or the second bracket part 120B. In some embodiments, there can be a single aperture 132 formed on either the first bracket part 120A or the second bracket part 120B.

As discussed above with respect to FIG. 8, the support member 114A can include the fixture 116 for securing the support member 114A in the assembled configuration. The lengthwise extent 124A of the bracket member 120 is the portion which can be inserted into the space of the fixture 116 to secure the support member 114A to the bracket 112 in the assembled configuration.

Aspects:

It is to be noted that any one of aspects 1-5 can be combined with any one of aspects 6-10, 11-12, 13-14, 15-23, 24-30, and/or 31-33. Any one of aspects 6-10 can be combined with any one of aspects 11-12, 13-14, 15-23, 24-30, and/or 31-33. Any one of aspects 11-12 can be combined with any one of aspects 13-14, 15-23, 24-30, and/or 31-33. Any one of aspects 13-14 can be combined with any one of aspects 15-23, 24-30, and/or 31-33. Any one of aspects 15-23 can be combined with any one of aspects 24-30 and/or 31-33. Any one of aspects 24-30 can be combined with any one of aspects 31-33.

Aspect 1. A bracket assembly, comprising:
a first bracket member, the first bracket member including a first aperture;
a second bracket member, the second bracket member including a second aperture; and
a pin assembly configured to maintain the first bracket member and the second bracket member in an assembled configuration, wherein the first aperture of the first bracket member and the second aperture of the second bracket member are aligned when the first bracket member and the second bracket member are in the assembled configuration.

Aspect 2. The bracket assembly according to aspect 1, wherein the first bracket member and the second bracket member are metal.

Aspect 3. The bracket assembly according to any one of aspects 1-2, wherein the pin assembly includes a pin and a retainer mechanism fixed to the pin, the retainer mechanism being configured to prevent the pin assembly from being removed from the first and second bracket members when in the assembled configuration.

Aspect 4. The bracket assembly according to any one of aspects 1-3, wherein the first and second bracket members are configured to receive at least one support member.

Aspect 5. The bracket assembly according to aspect 4, wherein the first and second bracket members include a plurality of apertures, the plurality of apertures being configured to receive a fastener such that the at least one support member is securable to the first and second bracket members.

Aspect 6. A shipping crate assembly, comprising:
a plurality of support members;
a plurality of bracket assemblies, each bracket assembly comprising:
    a first bracket member, the first bracket member including a first aperture;
    a second bracket member, the second bracket member including a second aperture; and
    a pin assembly configured to maintain the first bracket member and the second bracket member in an assembled configuration, wherein the first aperture of the first bracket member and the second aperture of the second bracket member are aligned when the first bracket member and the second bracket member are in the assembled configuration;
wherein the plurality of support members are connected via the plurality of bracket assemblies.

Aspect 7. The shipping crate assembly according to aspect 6, wherein the plurality of support members are wood.

Aspect 8. The shipping crate assembly according to any one of aspects 6-7, wherein the plurality of bracket assemblies are metal.

Aspect 9. The shipping crate assembly according to any one of aspects 6-8, wherein the shipping crate assembly is rectangular cuboidal and the plurality of bracket assemblies form a plurality of corners of the rectangular cuboidal shipping crate assembly.

Aspect 10. The shipping crate assembly according to any one of aspects 6-9, wherein the first and second bracket members are C-shaped in cross-section, and wherein ends of the plurality of support members are insertable into an open area formed in an interior portion of the C-shaped cross-section.

Aspect 11. A method for assembling a bracket, comprising:
aligning a first aperture of a first bracket with a second aperture of a second bracket;
inserting a pin assembly having a retainer mechanism into the aligned first and second apertures; and
setting the retainer mechanism to a retained configuration such that the first and second brackets are fixed together.

Aspect 12. The method according to aspect 11, further comprising:
aligning a third aperture of a third bracket with the first and second apertures prior to the inserting the pin assembly.

Aspect 13. A method for assembling a shipping crate assembly, comprising:
aligning a first aperture of a first bracket with a second aperture of a second bracket;
inserting a pin assembly having a retainer mechanism into the aligned first and second apertures;
setting the retainer mechanism to a retained configuration such that the first and second brackets are fixed together; and
inserting a support member into one of the first and second brackets.

Aspect 14. The method for assembling the shipping crate assembly according to aspect 13, further comprising:
fixing the support member to the one of the first and second brackets.

Aspect 15. A bracket for securing a plurality of support members for a shipping crate assembly, the bracket forming a corner of the shipping crate assembly, comprising:
first and second non-identical plates;
a connection line along which the first and second non-identical plates are joined;
the first and second non-identical plates extending perpendicularly from each other; and
a foot secured to the first and second non-identical plates, the foot being secured along the connection line.

Aspect 16. The bracket according to aspect 15, wherein the first and second non-identical plates extend from a first lengthwise extent of the connection line, wherein
the first non-identical plate extends a first distance from the first lengthwise extent of the connection line to a second lengthwise extent of the first non-identical plate,
the second non-identical plate extends a second distance from the first lengthwise extent of the connection line to a third lengthwise extent of the second non-identical plate, and
the first distance and the second distance are different.

Aspect 17. The bracket according to any one of aspects 15-16, wherein the first and second non-identical plates extend from the connection line, wherein
the first non-identical plate extends a first distance from the connection line to a first extent of the first non-identical plate,
the second non-identical plate extends a second distance from the connection line to a second extent of the second non-identical plate, and
the first distance and the second distance are different.

Aspect 18. The bracket according to any one of aspects 15-17, wherein the bracket is metal.

Aspect 19. The bracket according to aspect 18, wherein the bracket is a single piece of material and the connection line is a bend line forming the first and second non-identical plates.

Aspect 20. The bracket according to any one of aspects 15-19, wherein the bracket includes a plurality of apertures for receiving a plurality of fasteners.

Aspect 21. The bracket according to any one of aspects 15-20, wherein the first and second non-identical plates are configured to receive support members.

Aspect 22. The bracket according to any one of aspects 15-21, further comprising a bracket support member, the bracket support member being rotatable such that in an unassembled configuration the bracket support member extends in a direction that is about parallel to one of the first and second non-identical plates, and in an assembled configuration, the bracket support member extends in a direction of the connection line.

Aspect 23. The bracket according to aspect 22, wherein the foot includes an opening facing away from the first and second non-identical portions, the opening configured to receive the bracket support member such that the bracket is stackable.

Aspect 24. A shipping crate assembly, comprising:
a plurality of support members;
a plurality of brackets, each bracket comprising:
first and second non-identical plates;
a connection line along which the first and second non-identical plates are joined; the first and second non-identical plates extending perpendicularly from each other; and
a foot secured to the first and second non-identical plates, the foot being secured along the connection line,
wherein each of the plurality of brackets receives an end of two of the plurality of support members.

Aspect 25. The shipping crate assembly according to aspect 24, wherein the plurality of support members are wood.

Aspect 26. The shipping crate assembly according to any one of aspects 24-25, wherein the plurality of brackets are metal.

Aspect 27. The shipping crate assembly according to any one of aspects 24-26, wherein the shipping crate assembly is one of cuboidal or rectangular cuboidal, and the plurality of brackets form a plurality of corners of the shipping crate assembly.

Aspect 28. The shipping crate assembly according to any one of aspects 24-27, wherein the first and second non-identical plates extend from a first lengthwise extent of the connection line, wherein
the first non-identical plate extends a first distance from the first lengthwise extent of the connection line to a second lengthwise extent of the first non-identical plate,
the second non-identical plate extends a second distance from the first lengthwise extent of the connection line to a third lengthwise extent of the second non-identical plate, and
the first distance and the second distance are different.

Aspect 29. The shipping crate assembly according to any one of aspects 24-28, wherein the first and second non-identical plates extend from the connection line, wherein
the first non-identical plate extends a first distance from the connection line to a first extent of the first non-identical plate,
the second non-identical plate extends a second distance from the connection line to a second extent of the second non-identical plate, and
the first distance and the second distance are different.

Aspect 30. The shipping crate assembly according to any one of aspects 24-29, wherein the foot includes an opening facing away from the first and second non-identical portions, the opening configured to receive the bracket support member such that the shipping crate assembly is stackable with another shipping crate assembly.

Aspect 31. A shipping crate assembly kit, comprising:
a plurality of support members;
a plurality of brackets, each bracket comprising:
first and second non-identical plates;
a connection line along which the first and second non-identical plates are joined;
the first and second non-identical plates extending perpendicularly from each other; and
a foot secured to the first and second non-identical plates, the foot being secured along the connection line; and
a plurality of fasteners for securing the plurality of support members to the plurality of support brackets, and
wherein each of the plurality of brackets receives an end of two of the plurality of support members.

Aspect 32. The shipping crate assembly kit according to aspect 31, wherein the first and second non-identical plates extend from a first lengthwise extent of the connection line, wherein
the first non-identical plate extends a first distance from the first lengthwise extent of the connection line to a second lengthwise extent of the first non-identical plate,
the second non-identical plate extends a second distance from the first lengthwise extent of the connection line to a third lengthwise extent of the second non-identical plate, and
the first distance and the second distance are different.

Aspect 33. The shipping crate assembly kit according to any one of aspects 31-32, wherein the first and second non-identical plates extend from the connection line, wherein
the first non-identical plate extends a first distance from the connection line to a first extent of the first non-identical plate,
the second non-identical plate extends a second distance from the connection line to a second extent of the second non-identical plate, and
the first distance and the second distance are different.

Aspect 34. The shipping crate assembly kit according to any one of aspects 31-33, wherein the plurality of support members are wood and the plurality of brackets are metal.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:

1. A shipping crate assembly, comprising:
a plurality of first support members;
a plurality of brackets, each bracket including:
a bracket member having first and second non-identical parts, the bracket member being a metal plate, the bracket member including a connection line along which the first and second non-identical parts are joined, the first and second non-identical parts extending perpendicularly from each other;
a foot secured to the bracket member, the foot being secured along the connection line; and
a second support member made of metal and secured to the bracket member via a pin, wherein the second support member is rotatable about the pin, the second support member including one or more fixtures for securing the second support member in a fixed location,
wherein each of the plurality of brackets receives an end of two of the plurality of first support members, wherein a top surface of a first of the two of the plurality of first support members is disposed at a vertically different height from a top surface of the second of the two of the plurality of first support members, and a bottom surface of the first of the two of the plurality of first support members is disposed at a vertically different height from a bottom surface of the second of the two of the plurality of first support members.

2. The shipping crate assembly according to claim 1, wherein the plurality of first support members is composed of wood and the brackets are composed of metal.

3. The shipping crate assembly according to claim 1, wherein the shipping crate assembly is one of cuboidal or rectangular cuboidal, and the plurality of brackets form a plurality of corners of the shipping crate assembly.

4. The shipping crate assembly according to claim 1, wherein the first and second non-identical parts extend from a first lengthwise extent of the connection line, wherein the first non-identical part extends a first distance from the first lengthwise extent of the connection line to a second lengthwise extent of the first non-identical part,
the second non-identical part extends a second distance from the first lengthwise extent of the connection line to a third lengthwise extent of the second non-identical part, and
the first distance and the second distance are different.

5. The shipping crate assembly according to claim 1, wherein the first and second non-identical parts extend from the connection line, wherein
the first non-identical part extends a first distance from the connection line to a first extent of the first non-identical part,
the second non-identical part extends a second distance from the connection line to a second extent of the second non-identical part, and
the first distance and the second distance are different.

6. The shipping crate assembly according to claim 1, wherein the foot includes an opening facing away from the first and second non-identical parts, the opening configured to receive the second support member such that the shipping crate assembly is stackable with another shipping crate assembly.

7. The shipping crate assembly according to claim 1, wherein the second support member includes one or more second fixtures disposed between an end of the second support member and the one or more fixtures, the end of the second support member being disposed relatively farther from the pin than the one or more first fixtures; and
the shipping crate assembly further includes:

a cross-support member having second brackets at each end of the cross-support member,
wherein the one or more second fixtures are for securing the cross-support member to the second support member, wherein the cross-support member is secured to the second support member via an interference fit between the one or more fixtures and the second brackets.

8. The shipping crate assembly according to claim 1, wherein a major surface of the first of the two of the plurality of first support members is perpendicular to a major surface of the second of the two of the plurality of first support members.

9. A shipping crate assembly kit, comprising:
a plurality of first support members;
a plurality of brackets, each bracket including:
   a bracket member having first and second non-identical parts, the bracket member being a metal plate, the bracket member including a connection line along which the first and second non-identical parts are joined the first and second non-identical parts extending perpendicularly from each other;
   a foot secured to the first and second non-identical parts, the foot being secured along the connection line; and
   a second support member made of metal and secured to the bracket member via a pin, wherein the second support member is rotatable about the pin, the second support member including one or more fixtures for securing the second support member in a fixed location; and
a plurality of fasteners for securing the plurality of first support members to the plurality of brackets, and
wherein each of the plurality of brackets receives an end of two of the plurality of first support members, wherein a top surface of a first of the two of the plurality of first support members is disposed at a vertically different height from a top surface of the second of the two of the plurality of first support members, and a bottom surface of the first of the two of the plurality of first support members is disposed at a vertically different height from a bottom surface of the second of the two of the plurality of first support members.

10. The shipping crate assembly kit according to claim 9, wherein the first and second non-identical parts extend from a first lengthwise extent of the connection line, wherein the first non-identical part extends a first distance from the first lengthwise extent of the connection line to a second lengthwise extent of the first non-identical part,
the second non-identical part extends a second distance from the first lengthwise extent of the connection line to a third lengthwise extent of the second non-identical part, and
the first distance and the second distance are different.

11. The shipping crate assembly kit according to claim 9, wherein the first and second non-identical parts extend from the connection line, wherein
the first non-identical part extends a first distance from the connection line to a first extent of the first non-identical part,
the second non-identical part extends a second distance from the connection line to a second extent of the second non-identical part, and
the first distance and the second distance are different.

12. The shipping crate assembly kit according to claim 9, wherein the plurality of first support members are composed of wood and the plurality of brackets are composed of metal.

* * * * *